UNITED STATES PATENT OFFICE 2,576,445

RECOVERY OF VANADIUM VALUES FROM AN ALKALI METAL VANADATE SOLUTION

Sandford Stoddard Cole, Metuchen, and John Stuart Breitenstein, Linden, N. J., assignors to National Lead Company, New York, N. Y., a corporation of New Jersey No Drawing. Application October 11, 1949, Serial No. 120,826

4 Claims. (Cl. 23—18)

This invention relates to the process for the recovery of the vanadium values from an alkali metal vanadate solution. More specifically, it relates to a process for the recovery of the vanadium values as a complex calcium vanadate precipitate.

The recovery of vanadium values from various types of ores or concentrates is a difficult and complicated problem. Many types of processes have been proposed and utilized. One such process involves roasting the ore or concentrate at elevated temperatures in the presence of alkali metal salts and subsequently leaching the roasted material to solubilize the so-formed alkali metal vanadate therefrom. The present invention embraces a process for the recovery of the vanadium values from such an alkali metal vanadate solution.

An object of the present invention therefore is to present an economical process which precipitates substantially all of the vanadium values from an alkali metal vanadate solution. Another object is to utilize inexpensive precipitation agents in the recovery of the vanadium values. These and other objects will become apparent from the following more complete description of the invention.

It has been discovered by the process of this invention that substantially all of the vanadium values may be recovered from an alkali metal vanadate solution having a pH of 7.5 to 8.5 by treating said solution with calcium chloride and hydrated lime to precipitate and separate a complex calcium vanadate composition therefrom.

According to this process it is preferred to use a vanadate solution which has a pH of 7.5 to 8.5 to obtain the most favorable benefits of this process. If vanadium solutions are employed which lie above pH of 8.5, the solution preferably should be adjusted with acidic reagents to lower the pH to fall within this preferred range before carrying out the precipitation of the vanadium values.

Most processes for the recovery of vanadium require the employment of solutions containing relatively high concentrations of vanadium, to obtain high recoveries of the vanadium values, but the proceess of the present invention is not restricted to such concentrated solutions but may be used with equal effectiveness on dilute solutions containing small quantities of vanadium, e. g. from less than 1 to up to about 10 grams per liter vanadium in the alkali metal vanadate solution.

The precipitating agents used in the present process are hydrated lime and calcium chloride. Both agents are necessary when precipitating the vanadium values from solutions within this pH range in order to obtain high recoveries. The employment of either hydrated lime or calcium chloride alone or used singly without the presence of the other agents produce low recoveries. The presence of the two precipitating agents produces a synergistic effect in the precipitation of the vanadium values and high yields, i. e. greater than 99%, have been obtained by this process. The amount of agents necessary is not critical and may vary considerably, but for efficient results it has been found that for each part of vanadium present in the alkali metal vanadate solution, it is necessary to add at least 0.3 part of calcium chloride and at least 2.0 parts of hydrated lime; while the preferred range to obtain high yields with minimum quantity of precipitating agents requires from 0.4 part to 2.0 parts of calcium chloride and from 2.0 parts to 4.0 parts of hydrated lime. The agents are preferably mixed with water and added in solution or slurry form to the vanadate solution but the dry agents may be added if desired.

The reaction is preferably carried out at room temperature and therefore a considerable saving in heating costs is attained over other proceesses which require elevated reaction temperatures. The time of reaction is fairly rapid to obtain good yields, e. g. 20 to 30 minutes are used for laboratory scale batches while 1 to 3 hours are used on large scale batches. The precipitate obtained is bulky and easily filtered and washed. Apparently the complex calcium vanadate composition is insoluble in water and therefore may be washed with water without encountering any washing difficulties. To further illustrate the present invention, the following examples are presented to show a preferred embodiment thereof:

EXAMPLE I

A sodium vanadate solution was prepared by roasting a magnetite ore with sodium chloride. 3 parts of sodium chloride were intimately mixed with 100 parts of a finely-ground, vanadium-containing magnetite ore. The mixture was then roasted in a rotary kiln under an oxidizing atmosphere at 900° C. for 2 hours. The roasted ore was then leached with water at room temperature under counter-current leaching conditions to produce the sodium vanadate solution. The solution contained 4.9 grams per liter of vanadium and had a pH of 8.0.

To this sodium vanadate solution were added at room temperature 0.5 part of calcium chloride (as a 10% solution) and 2.1 parts of hydrated lime (as a 10% calcium hydroxide slurry) for each part of vanadium present in the solution. The treated solution was then stirred at room temperature for 20 minutes, after which the white complex calcium vanadate composition was separated from the mother liquor by filtration. The precipitate was washed thoroughly with water to remove the adhering liquor. The analysis of the products showed the recovery of the vanadium values to be 99%.

EXAMPLE II

A sodium vanadate solution was prepared in the same manner as described in Example I except 10 parts of sodium carbonate plus 5 parts of sodium chloride were mixed with 100 parts of vanadium-containing magnetite ore. The leached solution contained 5.0 grams per liter vanadium and had a pH of 9.1. To this solution were added a 10% sulfuric acid solution in an amount sufficient to lower the pH to 7.7. The sulfuric acid was added slowly with stirring into the vanadate solution and the pH was continually checked during the acid addition by means of a pH meter.

The adjusted solution was then treated according to the method described in Example I except 1.7 parts of calcium chloride and 3.9 parts of hydrated lime were added for each part of vanadium instead of the amounts used in Example I. The recovery of the vanadium values was again 99%.

EXAMPLE III

Example I was repeated using 0.5 part of calcium chloride and 3.3 parts of hydrated lime. Again the vanadium recovery was 99%.

By the process of this invention, high yields are obtained as shown in the examples. If the precipitation is carried out with solutions having higher pH values than 8.5, the yield of vanadium falls off rapidly as the pH values are increased. For this reason, such excessively alkaline solutions should first be partially neutralized to fall within the preferred pH range of 7.5 to 8.5.

When precipitating vanadium from an alkali metal vanadate solution with calcium compounds according to this invention both calcium chloride and calcium hydroxide must be employed. Employment of these agents in combination results in a synergistic effect thereby producing exceptionally high yields. When the precipitating agents are used separately or individually, even though added in amounts equal to the calcium content of the combination of agents, the recovery of vanadium is very low as shown in the table. The comparative runs were carried out according to the process described in Example I:

Table

|  | Grams of Agents Added per grams of Vanadium Present | | Per Cent Vanadium Recovery |
|---|---|---|---|
|  | CaCl$_2$ | Ca(OH)$_2$ |  |
| Example I | 0.5 | 2.1 | 99 |
| Comparative Run #1 | 5.4 | 0.0 | 57 |
| Comparative Run #2 | 0.0 | 3.9 | 60 |

By use of the present process exceptionally high yields of the vanadium values are obtained directly from an alkali metal vanadate solution and very dilute solutions may be utilized with equal effectiveness. The precipitated complex calcium vanadate composition is bulky and is easily filtered off and washed. The cost of the operation is inexpensive since the precipitation is carried out at room temperature with the use of inexpensive precipitating agents.

While this invention has been described and illustrated by the examples shown, it is not intended to be strictly limited thereto and other variations and modifications may be employed within the scope of the following claims.

We claim:

1. A process for the recovery of vanadium values from an alkali metal vanadate solution having a pH from 7.5 to 8.5 which comprises treating said solution with calcium chloride and hydrated lime and precipitating and separating a complex calcium vanadate composition therefrom.

2. A process for the recovery of vanadium values from an alkali metal vanadate solution which comprises adjusting the pH of the solution to 7.5–8.5, treating said solution with calcium chloride and hydrated lime, precipitating and separating a complex calcium vanadate composition therefrom.

3. Process according to claim 1 in which for every part of vanadium present in the sodium vanadate solution at least 0.3 part of calcium chloride and at least 2.0 parts of hydrated lime are added to precipitate said complex calcium vanadate composition.

4. Process according to claim 1 in which for every part of vanadium present in the sodium vanadate solution from 0.4 part to 2.0 parts of calcium chloride and from 2.0 parts to 4.0 parts of hydrated lime are added to precipitate said complex calcium vanadate composition.

SANDFORD STODDARD COLE.
JOHN STUART BREITENSTEIN.

REFERENCES CITED

The following references are of record in the file of this patent:

UNITED STATES PATENTS

| Number | Name | Date |
|---|---|---|
| 828,850 | Haynes et al. | Aug. 14, 1906 |
| 1,293,402 | Giles et al. | Feb. 4, 1919 |
| 1,293,403 | Giles et al. | Feb. 4, 1919 |
| 1,392,745 | Copelin | Oct. 4, 1921 |